United States Patent [15] 3,652,786

Morishita [45] Mar. 28, 1972

[54] TWO-TUBE TYPE COLOR CAMERA SYSTEM

[72] Inventor: Masanobu Morishita, Tokyo, Japan

[73] Assignee: Nippon Electric Company Limited, Tokyo, Japan

[22] Filed: Oct. 8, 1970

[21] Appl. No.: 79,023

[30] Foreign Application Priority Data

Oct. 13, 1969 Japan....................................44/81999
Aug. 7, 1970 Japan....................................45/69627

[52] U.S. Cl. ........................................178/5.4 R, 178/5.4 ST
[51] Int. Cl. ...........................................................H04n 9/08
[58] Field of Search .......................178/5.4 R, 5.4 W, 5.4 ST

[56] References Cited

UNITED STATES PATENTS 3,415,945 12/1968 Cooper, Jr. et al................178/5.4 W
3,294,898 12/1966 Gold.................................178/5.4 W

*Primary Examiner*—Robert L. Richardson
*Attorney*—Ostrolenk, Faber, Gerb & Soffen

[57] ABSTRACT

A color TV system in which reflected light from the object is split into short and long wavelength components which are then scanned in the conventional manner by TV camera tubes. The long and short wavelength components are selected so as to at least partially overlap one another. The scanned signals generated by the camera tubes, after undergoing noise removal and compensation to correct for frequency deterioration and attenuation, are combined in a multiplier circuit to form a signal representative of the product of the two input signals. The product signal is then combined with the short and long wavelength signals in a matrix circuit where the signals are combined in three different predetermined manners to form resultant output signals representative of the red, green and blue component signals, thus enabling the generation of the three primary color signal through the use of only a two-tube system.

5 Claims, 7 Drawing Figures

FIG. 1
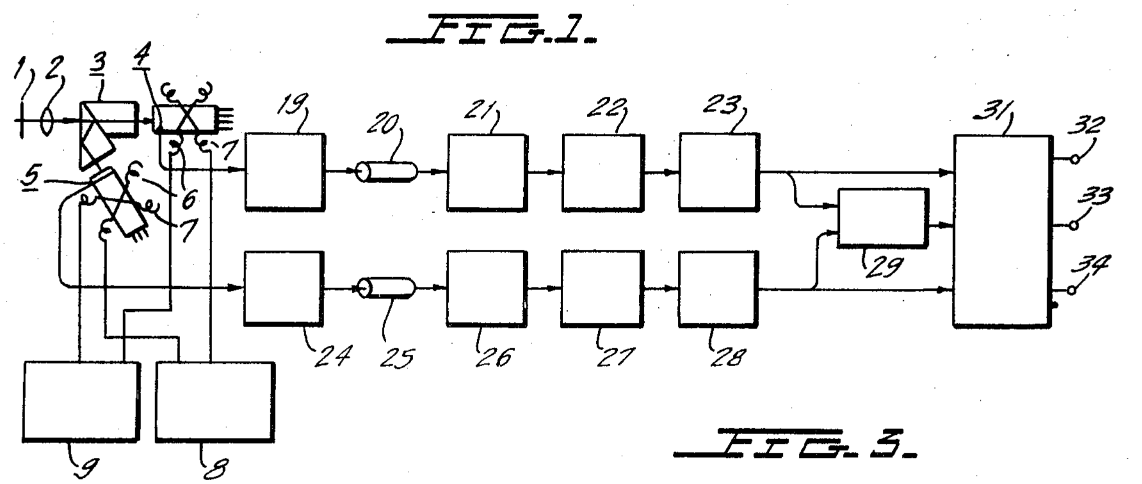
FIG. 3
FIG. 2
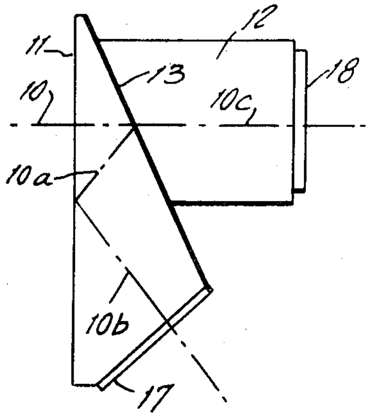
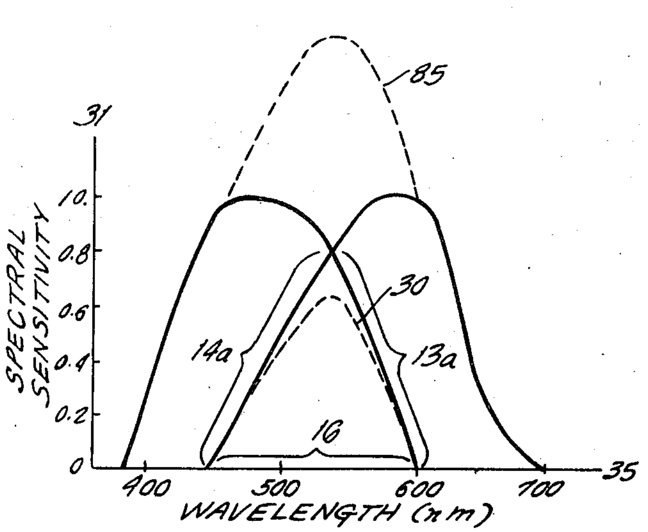
FIG. 4
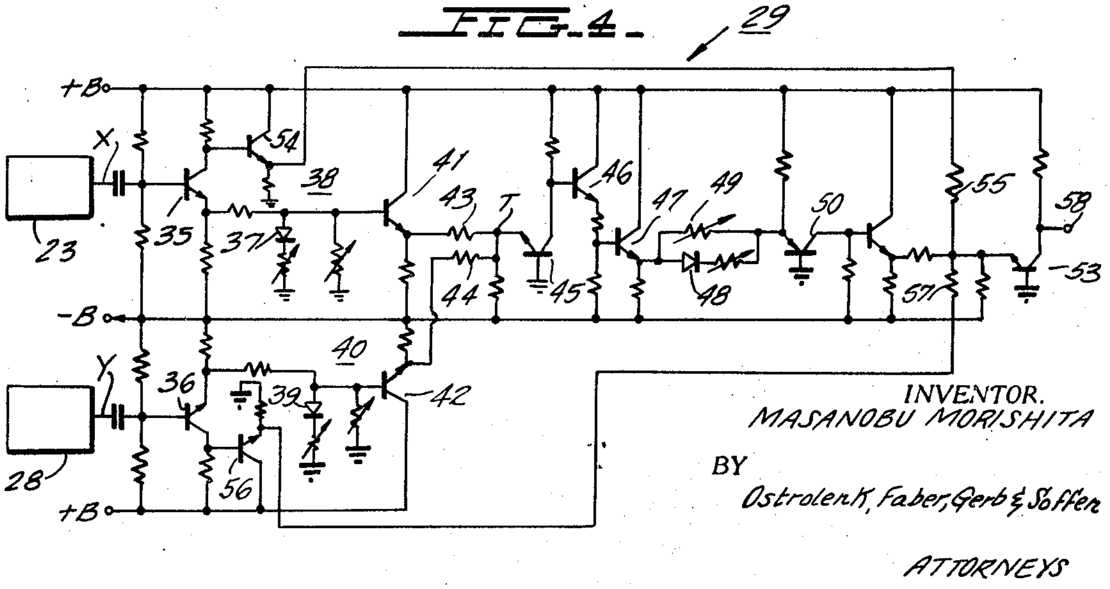
INVENTOR.
MASANOBU MORISHITA
BY
Ostrolenk, Faber, Gerb & Soffen
ATTORNEYS INVENTOR
MASANOBU MORISHITA
by Ostrolenk, Faber, Gerb & Soffen
ATTORNEYS

TWO-TUBE TYPE COLOR CAMERA SYSTEM

In a modified embodiment the long and short wavelength component signals are summed in an additional adder circuit to generate a luminance output signal which approximates the visual sensitivity curve thereby providing the same signals as are generated in conventional four-tube type color camera systems through the use of only two camera tubes.

The present invention relates to color television and more particularly to a novel two-tube type color television system capable of generating the same signals generated by conventional four-tube type color camera systems.

There are several known techniques for generating color television signals at the transmission end. One such system employs a color camera for generating color television signals of the sequential type in which the signals of the three primary colors are generated in a sequential fashion with a certain definite regularity with respect to time. In this type of color camera, there is no problem regarding color registration (i.e., image overlapping) since only one camera tube is used. On the other hand, the repetition frequency is three times as great as that required for conventional transmission, the image bandwidth is significantly expanded and such color transmission is not compatible with the black-and-white television system. As a result, the simultaneous type color camera is employed to overcome the above disadvantages. This type of color camera has a capability of generating a plurality of chrominance signals simultaneously with respect to time.

One type of simultaneous color camera has a capability of generating chrominance signals of two primary colors through the use of two camera tubes, whereby all of the colors are reproduced from the two-color components. This method, however, cannot always reproduce the colors present in the original image faithfully. Presently, therefore, the three primary color simultaneous type color camera in which all colors are reproduced by the color signals of three primary colors is widely used.

In most of the three primary colors simultaneous camera systems presently in use, there are provided three camera tubes whereby the red signal, green signal and blue signal are respectively detected by each of the individual tubes. In this system, any appreciable phase differences among the three chrominance signals must be avoided so as to prevent their appearance in any part of the screen of the reproduced picture. Practically, when such color video signals are converted into the standard color television signal as used in Japan, for example, the resolution of the luminance signal component is lowered even if the frequency characteristic of each independent video signal is of sufficient width, due to the fact that there are differences in the deflection characteristics among the three camera tubes and further due to the fact that it is very difficult to eliminate the phase differences among the three chrominance signals, or to realize perfect image registration. This drawback is inevitable in color camera systems of the three-tube type.

In order to eliminate the above drawbacks, an improved color camera system has been proposed. In the proposed color camera system, a separate luminance signal channel is provided for generating the luminance signal component in order to increase the resolution of the luminance signal and thus improve the combined characteristics of the color camera. This color camera is generally of two types, namely the four-tube type and the two-tube type. The former type is characterized in that the luminance signal, red signal, green signal and blue signal are respectively detected by the individual camera tubes. The latter system is characterized in that the two-color camera respectively detects the luminance signal and the red, green and blue signals in point sequence fashion through a stripe-shaped color filter provided in front of the photoconductive film of one of the camera tubes.

In the four-tube type, four signal channels are used necessitating a large number of circuit elements whereby the overall size of the device is quite large and high reliability in operation is difficult to obtain. In the latter color camera system, the resolution is found to be insufficient thereby significantly affecting the cross-talk of the chrominance signal requiring that an optical system and camera tube of extremely high resolution be employed.

In view of the problems outlined above and which are associated with systems of the simultaneous type, it is a primary object of the present invention to provide a color camera system which is characterized by its ease of adjustment and capability of providing simultaneous signals of the three primary colors which have excellent resolution.

Another object of the present invention is to provide a simultaneous type color camera system in which only two camera tubes are employed whereby signals of the three primary colors are obtained simultaneously and the signals so generated have excellent resolution.

The system of the present invention provides means for decomposing incident light from the object into long and short wavelength components, which components are mutually partially overlapping. The long and short wavelength components are projected upon photoelectric converters such as camera tubes, whereby the outputs of the photoelectric converters are combined to form a signal representative of the product of the two input signals in order to generate an electric signal representative of the overlapped portion therebetween. Further combining circuits are provided to generate the electric signal of the short wavelength component and the electric signals of the long wavelength components from the electric signal corresponding to the overlapped portion and the outputs of the photoelectric converters. In this manner, the electric signals of the long and short wavelength components and the medium wavelength component between the long and short wavelength components are generated. As a further feature, the present invention provides means for combining the outputs of the photoelectric converters in predetermined proportions for developing an electric signal corresponding to the brightness component, which signal approximates the visual sensitivity curve. In this manner, the present invention is thus capable of simultaneously producing electric signals of the long, short and medium wavelength components as well as the luminance component which is functionally related thereto.

In the color camera system of the present invention as described hereinabove, adjustment of registration (i.e., image overlapping) is markedly simplified as compared with simultaneous systems of the three-tube camera type since only two camera tubes are required. Accordingly, a color television signal having excellent resolution is easily obtained. Also, since the incident light from the object is separated into only two components, the amount of light which reaches the photoelectric converter face is greater than that reaching the camera tubes of the three-tube type camera systems. This enables the two-tube type camera system of the present invention to provide excellent results through the use of camera tubes of significantly reduced sensitivity thereby introducing a desirable influence into the delay characteristics of the camera tube to provide excellent operating results under all operating conditions. Furthermore, since the two signal channels provided in the system of the present invention are sufficient to handle most signals, the number of circuit elements and overall size of the system is thereby significantly reduced while reliability is markedly increased.

In brief, the color camera of the present invention is quite advantageous from various points of view and the objective set forth hereinabove, as well as other objectives and advantages which will become apparent when reading the accompanying description and drawing in which:

FIG. 1 is a block diagram showing a preferred embodiment of the two-tube type color camera system incorporating the principles of the present invention;

FIG. 2 is a schematic view showing one example of a two-color decomposing optical system which may be used in the camera system of FIG. 1;

FIG. 3 is a diagram containing curves which show the spectral characteristics of the two-color resolving optical system of the type shown in FIG. 2;

FIG. 4 is a circuit diagram showing one example of a multiplier circuit which may be incorporated in the system of FIG. 1;

Figure 5:
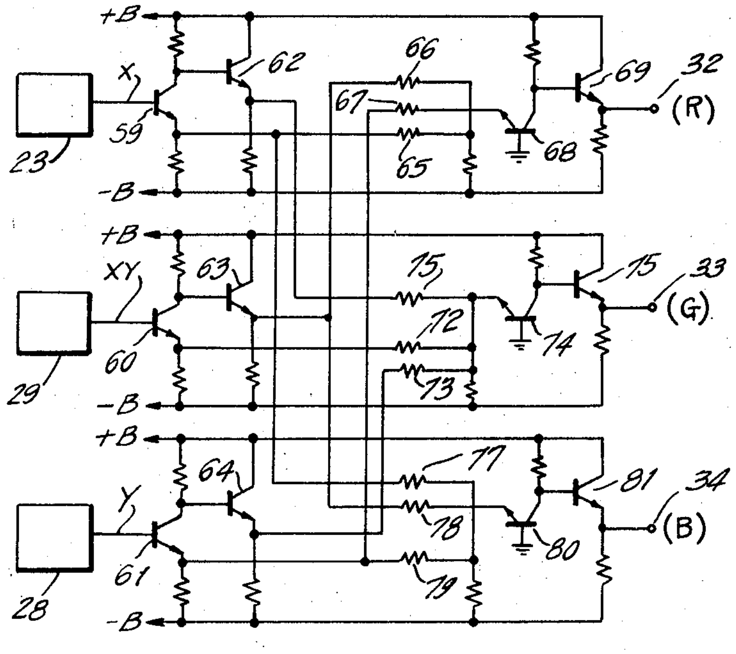
FIG. 5 is a circuit diagram showing one example of a matrix circuit which may be utilized in the embodiment of FIG. 1.

Referring initially to FIG. 1 which shows one embodiment of the present invention, light reflected from an object 1 is focused upon the two-color decomposing optical system 3 through a lens system 2. The focused light is then decomposed into light of a long wavelength component and light of a short wavelength component. The long wavelength component is directed to the photoelectric converter face of a first camera tube 4, while the short wavelength component light rays are projected upon the photoelectric converter face of the second camera tube 5.

A horizontal deflection signal is simultaneously supplied to the horizontal deflecting coils 6 of the camera tubes 4 and 5 from a first deflection circuit 8. In a similar fashion, the vertical deflection signal is simultaneously applied to the vertical deflecting coils 7 of camera tubes 4 and 5 from deflection circuit 9. Under control of the circuits 8 and 9, the target faces of camera tubes 4 and 5 are synchronously scanned by their respective electron beams in conventional fashion. Since camera tubes of this type are well known, a detailed description thereof will be omitted for purposes of simplicity. A detailed description of one suitable camera tube which may be utilized in the present invention is set forth in U.S. Pat. No. 3,403,284 and this description is incorporated herein by reference.

The two-color decomposing optical system 3 may, for example, be formed through the use of dichroic mirrors or the like. Making reference to FIG. 2, the two-color decomposing optical system 3, shown in detail therein, consists of a right-triangular prism 11 whose longest side is aligned substantially perpendicularly to axis 10 representing the direction of the incident light. A prism 12 whose axis is coincident with the forward direction of the incident axis 10 is arranged in surface contact with one surface of prism 11. Part of the incident light directed along axis 10 is passed through prisms 11 and 12, while part of the incident light is reflected from the reflecting multilayer film filter 13 disposed between the boundary surface of prisms 11 and 12. The light so reflected moves in a direction shown by arrow 10*a* until it reaches the longest face of triangular prism 11 at which point it is fully internally reflected to move along the path designated by arrow 10*b* so as to pass out of prism 11 through the third face thereof. Filter 13 is designed so as to pass the long wavelength component of light therethrough while reflecting the short wavelength component. Thus, the incident light is decomposed into two color components, namely the long wavelength component which moves along incident axis 10 and through prism 12 as shown by arrow 10*c*, and a short wavelength component which is emitted from the third face of prism 11 in a direction indicated by arrow 10*b*.

The reflection characteristic of reflecting multilayer film filter 13 is designed so that the two components 14 and 15 have a mutually overlapped portion 16 as is illustrated in FIG. 3 in which a plot of wavelength versus specific sensitivity is shown, and wherein the long wavelength component contains both red and green light rays and the short wavelength component contains blue and green components. It is preferable to decompose the components so that the portion 14*a* of curve 14 and the portion 15*a* of curve 15 are coincident with both sides of the spectral characteristics of the green color components derived in conventional three-tube type color camera devices. If necessary, trimming filters (i.e., correction filters) 17 and 18 may be respectively provided at the output surfaces of prisms 11 and 12 to assure the fact that the long and short wavelength components form the required spectral characteristic curves.

Having decomposed the incident light into the long and short wavelength components, the long wavelength component of light reflected from object 1 strikes the target face of camera tube 4 while the short wavelength component of light reflected from object 1 strikes the target face of the second camera tube 5. Physical arrangement of these components are such that the optical distance from object 1 to camera tube 4 (measured along path 10–10*a*–10*b*, see FIG. 2) is equal to the optical distance from object 1 to camera tube 5 measured along the path 10–10*c*.

The photoelectric face of camera tube 4 is scanned in conventional fashion. The output signal generated is applied to noise filter circuit 21 by way of preamplifier 19 and coaxial cable 20. Hum noise, spike noise and the like are removed from the signal by noise suppression circuit 21. After removal of noise, the long wavelength component signal is applied to compensation circuit 22 in which the signal is modified to compensate for the deterioration of the frequency characteristic and attenuation of the high frequency component. The resultant compensated output signal is applied to the input of a process amplifier 23 which provides compensation for the flare phenomenon as well as providing for white compression. The short wavelength component signal derived from camera tube 5 undergoes similar treatment through amplifier 24, coaxial cable 25, noise filter circuit 26, compensation circuit 27 and process amplifier 28, respectively, which circuits are substantially identical in design and function to the circuits 19–23.

A portion of the output signals of process amplifiers 23 and 28 are supplied to respective inputs of multiplier circuit 29 which is designed to generate a signal representative of the product of the long wavelength and short wavelength component signals which further corresponds to overlapped portion 16 shown in FIG. 3 or, in other words, which corresponds to the medium wavelength component signal corresponding to the spectral characteristic shown by the dotted line 30 of FIG. 3. The product signal developed by multiplier circuit 29, together with the output signals of process amplifiers 23 and 28, are applied to respective inputs of a matrix circuit 31 which combines the input signals in such a fashion as to subtract the medium wavelength component from the long wavelength component to derive a red color signal which appears at output terminal 32. The green color signal which appears at terminal 33 is derived primarily from the medium wavelength component signal, while the resultant blue color signal, which appears at terminal 34, is derived by subtracting the medium wavelength component signal from the short wavelength component signal.

The multiplier circuit 29 of FIG. 1 is shown in detail in FIG. 4. A portion X of the output signal of process amplifier 23 is applied to the base of transistor 35 which is connected in emitter follower fashion to convert the applied voltage signal into a current signal. In like manner, a portion Y of the output signal of process amplifier 28 is applied to the base of a second emitter follower connected transistor 36 to convert the input signal into a current signal. The current signals are taken from the emitters of transistors 35 and 36 and are further converted into signals of $\log(X+1)$ and $\log(Y+1)$, respectively, through the logarithm circuits 38 and 40 which are each comprised of diodes 37 and 39, respectively. These converted outputs are further converted into low impedance signals by means of the emitter follower connected transistors 41 and 42, respectively. The output signals taken from the emitters of transistors 41 and 42 are added together by a summing circuit comprised of resistors 43 and 44 connected in common at terminal T so as to produce a resultant signal representative of $\log(X+1)\cdot(Y+1)$. This resultant output is then passed through grounded base transistor 45 and emitter follower connected transistors 46 and 47 which convert the output into a low impedance signal and supply this signal to an exponential circuit E which includes diode 48. The signal log $(X+1)\cdot(Y+1)$ is converted into a signal representing $(X+1)\cdot(Y+1)$ by the exponential circuit E which then supplies the signal to the base of emitter follower connected transistor 51 through grounded base transistor 50. The emitter output of transistor 51 is, in turn, supplied to the emitter of grounded base transistor 53 through series connected resistor 52.

The collector output of transistor 35, which converts the output portion $X$ of amplifier 23 into a current signal, is coupled to the base of emitter follower transistor 54. The inverted signal $-X$ appearing at the emitter of transistor 54 is coupled to the emitter of transistor 53 through resistor 55. In a similar fashion, the collector of emitter follower 36, which converts the output portion $Y$ of amplifier 28 into a current signal, is supplied to the base of emitter follower transistor 56 whereby the inverted signal $-Y$ appearing at the emitter of transistor 56, after undergoing current amplification is supplied to the emitter of transistor 53 through resistor 57. The summation of the signals $(X+1)\cdot(X+1)$, $-X$ and $-Y$ in the emitter of transistor 53 results in the generation of signal $(XY+1)$ at the collector output terminal 58 of transistor 53. By cutting off the current of this signal through the grounded base of transistor 53, the output signal $XY$ (i.e., the product of the output signal portions of process amplifiers 23 and 28) is obtained.

The signal representing the product $XY$ and the outputs $X$ and $Y$ of process amplifies 23 and 28 are then combined within matrix circuit 31 to obtain the red, green and blue color signals. An example of a matrix circuit 31 which may be advantageously employed in the system of FIG. 1, is shown in detail in FIG. 5 and is so arranged as to generate the signals of the three primary colors which are necessary to provide for isochromatic adjustment of the three primary colors at the color receiving tube.

Figure 6:
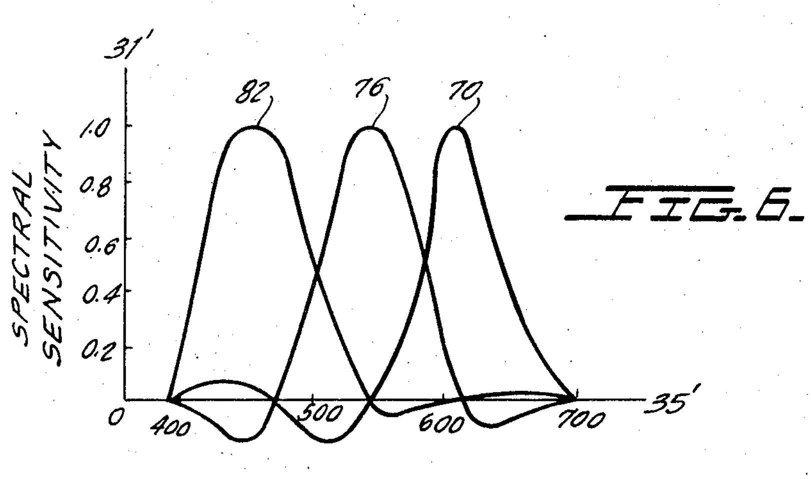
FIG. 6 is a diagram containing curves which show the combined spectral characteristics which correspond to the electric signals of the three primary colors generated at the output terminals of the matrix circuit of FIG. 5.

The respective outputs, $X$, $XY$ and $Y$ of process amplifier 23, multiplier circuit 29 and process amplifier 28 are supplied to the bases of transistors 59, 60 and 61, respectively. Transistors 59, 60 and 61 are connected to operate as phase inverter circuits so as to derive the signals $X$ and $-X$ at the base and collector of transistor 59, $XY$ and $-XY$ at the base and collector electrodes of transistor 60 and $y$ and $-Y$ at the base and collector electrodes of transistor 61, respectively. The negative polarity output signals $-X$, $-XY$ and $-Y$ appearing at the collectors of transistors 59, 60 and 61, are coupled respectively to the bases of emitter follower transistors 62, 63 and 64 to be converted into low impedance output signals. The signal $X$ from the emitter of transistor 59, the signal $-XY$ from the emitter of transistor 63 and the signal $Y$ from the emitter of transistor 61 are supplied to the emitter of grounded base transistor 68 through a summing circuit respectively comprised of resistors 65, 66 and 67. The resistance value of resistors 65, 66 and 67 are selected so that the overlapped portion of signals $X$ and $XY$ in the corresponding spectral characteristic curve is nearly canceled whereby the remainder of the signal $X$ will be comprised mainly of the red color component while the blue color component of signal $Y$ will be at an infinitesimal level, whereby the red color component will be derived at the collector of transistor 68. This output signal is applied to the base of emitter follower transistor 69 which generates the red color signal component R at its emitter output terminal 32. The spectral characteristic corresponding to the red color signal R is indicated by curve 70 shown in FIG. 6.

The signals $-X$, $XY$ and $-Y$ respectively appearing at the emitters of transistors 62, 60 and 64 are ultimately supplied to the emitter of grounded base transistor 74 through a summing circuit comprised of resistors 71, 72 and 73 which adds the aforementioned components to derive a green color signal G consisting primarily of the green component, the reverse polarity red component of infinitesimal level and the blue component. This signal, appearing at the collector of transistor 74 is coupled to the base of emitter follower transistor 75 to the emitter output terminal 33, supplies the green color signal G which is shown by curve 76 of FIG. 6.

In a similar fashion to that described hereinabove, the signals $X$, $-XY$ and $Y$ respectively appearing at the emitters of transistors 59, 63 and 64 are applied to the emitter of transistor 80 through a summing circuit comprised of resistors 77, 78 and 79. The resistance summing circuit together with the grounded base transistor 80 generate the blue color signal B which consists primarily of the blue component and which is coupled to the output terminal 34 through emitter follower transistor 81. The spectral characteristic corresponding to the blue color signal B is shown by curve 82 in FIG. 6. It can thus be seen that the resultant color television signal can be formed through the utilization of the three primary color signals R, G and B in conventional color receivers.

In accordance with the foregoing description, the two-tube type color camera of the present invention decomposes incident light reflected from an object to be displayed into long and short wavelength components which are partially overlapped so as to simultaneously derive the electric signals R, G and B of the three primary colors. Since only two camera tubes are employed in the system, the number of adjustment points is reduced to less than two-thirds that required in conventional three-tube type color camera devices. As a result, adjustment for registration (image overlapping) is greatly simplified and may therefore be carried out in a minimum amount of time. Furthermore, the system lends itself to providing for accurate adjustment for overlapping in order to obtain a color television signal having excellent resolution.

Figure 7:
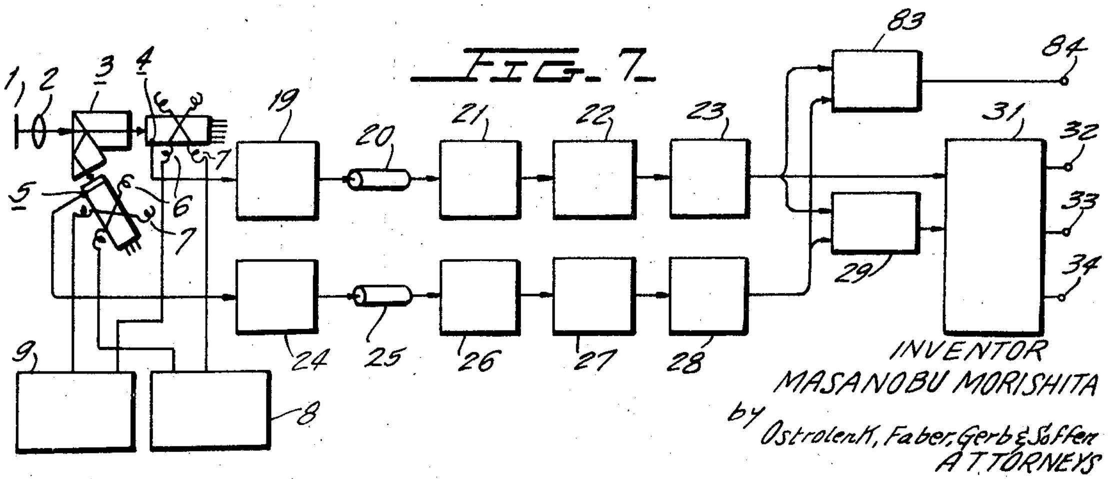
FIG. 7 is a block diagram showing another preferred embodiment of the invention.

The green color signal G forms a significant part of the brightness signal. The generation of this signal through the use of multiplier circuit 29 may have an unfavorable effect upon its S/N (signal-to-noise)ratio. As a result, FIG. 7 illustrates another embodiment of the present invention which is a modification of the embodiment of FIG. 1 and in which like elements are designated by like numerals. The embodiment of FIG. 7 differs from that shown in FIG. 1 in that an adder circuit 83 is provided. Adder circuit 83 generates a luminance signal of vastly improved S/N ratio. In operation, portions of the outputs of process amplifiers 23 and 28 are supplied to respective inputs of adder circuit 83 such that the long and short wavelength component signals are added to one another in accordance with a predetermined ratio so that the luminance signal output approximates the visual sensitivity curve whereby the signal corresponding to the spectral characteristic is shown by the dotted line curve 85 of FIG. 3. Thus, by using two photoelectric converters 4 and 5, the luminance signal and the red, green and blue color signals are simultaneously obtained, resulting in the generation of the same signals which heretofore required four camera tubes as exemplified by conventional four-tube type color camera devices.

In accordance with the present invention, the incident light from the object to be displayed is separated into only two components as compared with conventional four-tube type camera devices so that a larger amount of light reaches the photoelectric face of the camera tube than is the case in the three-tube type color camera. This makes it possible to utilize the present invention under less than desirable operating conditions without unreasonably increasing the sensitivity of the camera tubes employed. In addition, only two signal channels are required to generate the necessary signals providing a significant reduction in the number of circuit elements employed as compared with systems of the three-tube type so as to reduce overall size and increase operating reliability.

In the above embodiments half-mirrors may be substituted for the two-color decomposing optical system 3, whereby the incident light is separated into two components and the separated components are projected upon first and second camera tubes 4 and 5 through respective optical filters wherein one filter passes long wavelength light while blocking short wavelength light and whereby the other filter passes short wavelength light while blocking long wavelength light. As was the case with the optical system shown in FIG. 3, the characteristics of the filters employed are such that the long wavelength and short wavelength components have partially overlapping spectral characteristics. As another alternative, the camera tubes of the type described in the aforementioned U.S. Pat. No. 3,403,284 may be substituted by solid-state camera devices employing solid-state elements which are operated to convert a light image into electrical signals. Obviously, the noise filter circuits 21 and 26 and compensation circuits 22 and 27 may be omitted in applications where high quality signals are not required such as is the case in industrial applications.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A two-tube color camera system comprising:

means for respectively decomposing incident light reflected from an object to be displayed into partially overlapping long and short wavelength components;

first and second photoelectric converters each being positioned adjacent said decomposing means for respectively receiving images of the object which are formed by light of the decomposed long and short wavelength components;

means coupled to said first and second photoelectric converters for simultaneously scanning said images to generate respective first and second electric signals;

means coupled to said first and second photoelectric converters for generating a third electric signal which constitutes the project of said first and second electrical signals;

combining means coupled to said first and second photoelectric converters and the output of said product forming means for combining said first, second and third signals into three output signals which respectively correspond to the aforementioned long and short wavelength components and a medium wavelength component which lies intermediate said long and short wavelength components.

2. The device of claim 1 further comprising means coupled to the outputs of said first and second photoelectric converters for adding said first and second electric signals to one another to generate a luminance output signal which approximates the visual sensitivity curve.

3. The device of claim 2 wherein said decomposing means is comprised of first and second prisms;

said first prism having one face thereof arranged substantially perpendicular to the direction of incident light;

a second face of said first prism being positioned adjacent one face of said second prism;

filter means positioned between said adjacent faces for passing the long wavelength component of light entering said first prism through said filter so as to pass through a second face of said second prism while reflecting the short wavelength component of light in such a manner as to pass through a third face of said first prism.

4. The color system of claim 1 wherein said product forming means is comprised of first and second means coupled to the outputs of said first and second photoelectric converters respectively for generating signals representative of the logarithm of said first and second signals;

means for adding said logarithmic signals;

means for converting the sum of said logarithmic signals into a signal representative of the antilog of said logarithmic signal, whereby the output thereof is a signal representative of the product of said first and second signals.

5. The color system of claim 1 wherein said combining means is comprised of first, second and third summing circuits;

phase inverter means coupled to receive said first, second and third signals for generating a pair of signals of equal magnitude and reverse polarity relative to their inputted signals;

each of said summing circuits coupled to respective of said phase inverter circuits for generating a respective one of said resultant output signals which respectively represent the red, green and blue color signals conventionally provided for operating a color receiver to reproduce a color image of the object to be displayed.

* * * * *